United States Patent
McCoy et al.

[15] 3,681,348
[45] Aug. 1, 1972

[54] OIL-SOLUBILIZING NITROGEN-CONTAINING PESTICIDAL COMPOUNDS

[72] Inventors: Frederic C. McCoy, Beacon; Carl Loyal W. Swanson, Hopewell Junction, both of N.Y.

[73] Assignee: Texaco Inc., New York, N.Y.

[22] Filed: Nov. 20, 1969

[21] Appl. No.: 878,586

[52] U.S. Cl. ........260/249.8, 260/479 C, 260/471 C, 260/481 C, 260/326 H, 260/326 R, 260/249.5, 260/553 R, 252/50, 252/51, 424/247, 424/274, 424/300, 71/93, 71/95, 71/121
[51] Int. Cl.....C07d 55/20, C07c 69/00, C07d 27/54
[58] Field of Search....................260/249.8, 326 H, 479 C, 294.7 F

260/471 C, 481 C, 326 H, 326 R, 249.5, 249.8, 553 R

[56] References Cited

FOREIGN PATENTS OR APPLICATIONS 930,224   7/1963   Great Britain................260/326

*Primary Examiner*—John M. Ford
*Attorney*—Thomas H. Whaley and Carl G. Ries

[57] ABSTRACT

This invention concerns a process for converting oil-insoluble substances, particularly pesticides, having at least one non-basic nitrogen-containing functional group, which are normally insoluble in petroleum oil, to soluble complexes by treatment with alkylated phenols, and the oil-soluble complexes resulting therein.

14 Claims, No Drawings

OIL-SOLUBILIZING NITROGEN-CONTAINING PESTICIDAL COMPOUNDS

This invention concerns a process for transforming organic substances normally insoluble in oil * *Oil-soluble as used herein refers to materials which do not possess sufficient solubility to permit the preparation of a clear 0.1 percent by wt. solution of SAE 20 paraffin based oil at 75°–80° F. to their oil solubilized forms.

More particularly, this invention relates to a process for converting oil-insoluble substances having at least one non-basic nitrogen-containing functional group to their oil-soluble forms and to the oil-soluble product produced therein.

In many instances, the solubilization of normally oil-insoluble substances is advantageous, since by rendering an additive soluble in the desired oily substrate, serious problems of sedimentation and unstable viscosity of the final composition are overcome. The latter difficulties are frequently encountered when dispersions of oil-insoluble pesticides are prepared for application to vegetation.

As is well known, pesticidal agents are used to destroy, inhibit or to control the growth of insects, bacteria and fungi, as well as undesirable plant life. The need for oil-soluble substances is especially pressing in the treatment of plants in tropical or sub-tropical climates, or in the application of the more highly toxic agricultural pesticides.  Pesticides include insecticides, fungicides, herbicides, nematocides, acaracides, rodenticides and plant growth regulators, defoliants and desiccants. For example, in the aforementioned climates, humidity is high and the humidity combined with frequent rainfall may remove a pesticide completely or render it ineffectual for pesticidal purposes. This necessitates more frequent applications of pesticide which, in addition to being troublesome and costly, makes it difficult to control the "pest," or condition being treated. Similarly, in the use of more highly toxic substances, repeated application causes a build-up of toxic material not only in the immediate vicinity of the application area but eventually into the adjacent water supply where it may become a potential public health problem. A further difficulty is that the use of relatively volatile water solutions or dispersions in warmer climates produces higher concentrations of the pesticide than may be desired on the plant treated, particularly when the application is from aircraft. This concentration effect can be injurious to the plant.

In view of the above problems, particularly in the application to pesticides in areas of high humidity and high rainfall, there is a need for a process to transform normally oil-insoluble substances, particularly pesticidal agents into oil-soluble forms.

Desirably, the transformation process would be safe, require mild conditions and could be utilized on a broad class of normally oil-insoluble materials. In addition, the inventive process would not require large capital outlays, would permit the use of commonly used application equipment and most important, would not impair the utility or, in the case of pesticides, the biological activity of the treated oil-solubilized substance. A process combining all or most of these attributes would represent a useful advance in the art.

It is therefore an object of this invention, among others, to provide a novel process for transforming normally oil-insoluble substances possessing at least one non-basic nitrogen-containing functional group, to the oil-soluble state.

A related object of this invention is to provide oil-soluble concentrates derived from the above-described process.

A more specific object of this invention is to make available a process for converting normally oil-soluble pesticidal compounds containing carbamate, triazine or imido radicals into oil-soluble forms.

Further objects will become apparent to those skilled in the art after a perusal of this disclosure.

In practice, at least one normally oil-insoluble compound possessing at least one non-basic, nitrogen-containing functional group is admixed with at least a molar excess of at least one alkylated phenol-type compound to form a fluid mixture, and continuing said mixing until a substantially clear solution is obtained. The solution can be stored as is or any insoluble particles can be separated prior to storage or use.

In the favored practice, at least one normally oil-insoluble pesticide containing at least one non-basic nitrogen-containing moiety selected from the group consisting of imido, carbamate, triazine and mixtures thereof, is admixed with at least a 2:1 molar excess of at least one alkylated phenol-type compound wherein the alkyl groups contain between three and 100 carbon atoms, in the presence of a relatively low-boiling inert solvent to form a fluid mixture, then continuing admixing said fluid mixture, (containing the normally oil-insoluble compound) until substantial solubilization of the compound takes place, and a clear solution is obtained. The substantially clear solution may be stripped of inert solvent with or without further clarification to produce an oil-soluble concentrate of pesticide or it can be stored with or without clarification in the diluted state.

In the most favored process at least one normally oil-insoluble pesticide possessing at least one non-basic carbamate, imido, triazine moiety or mixtures of these moieties, is admixed with a molar excess ranging from about 2:1 to 8:1, of at least one hydroxylated benzene nucleus alkylated with alkyl groups containing from six to 12 carbon atoms, in the presence of sufficient inert solvent to provide a fluid, easily stirred mixture, then continuing said mixing at temperatures ranging between 20° to 100° C. until substantial solubilization of the pesticide takes place and a substantially clear solution is obtained. Again the solution may be clarified or not, concentrated or diluted for subsequent use.

In order to more clearly set forth the scope of the subject invention the following additional disclosure is submitted:

A. Alkylated Phenol Type Compound

This is the generic designation used to define the solubilizing agents which solubilize the normally oil-insoluble substances. These solubilizing agents are chosen from the mono- and dinuclear aromatics that contain at least one alkylating group and at least one hydroxyl group. The alkylating group or groups can contain a total of between three and 100 carbon atoms, desirably from three to 30 carbon atoms and preferably from six to 12 carbon atoms. The alkylating groups can be arranged in either branched chains or straight chains although branched claims are preferred. The alkylated phenol-type compound can be in the form of relatively pure, discrete single compounds or in the form of blends or mixtures. Depending upon their physical state, solid or liquid, or the convenience of the user, the solubilizing compounds can be used with or without relatively low boiling inert solvents to assist in the solubilization process. These solvents, which are usually removed in a subsequent stripping operation, are described infra.

Illustrative of the favored class of solubilizing agents are the alkylated hydroxy mononuclear phenols, cresols and the like, such as the butyl phenols, the pentyl phenols, the hexyl phenols, the heptyl phenols, the octyl phenols, the nonyl phenols, the decyl phenols, the undecyl phenols, the dodecyl phenols, the tridecyl phenols, their mixtures, particularly where the alkyl groups contain from six to 12 carbon atoms and are branched rather than straight chain.

B. Normally Oil-Insoluble Substance

This is the generic term employed to define the group of normally oil-insoluble substances susceptible of transformation to oil-soluble forms. While the precise structural limitations of these substances have not been determined they appear to require:

1. Poor oil solubility in paraffinic oils of the SEA 20 type to the extent that even at 75°–80° F. less than 0.1 percent by weight solutions of the substance can be prepared. Visual determination is used as a test in determining whether a given solution is unclear or contains a separated phase or precipitate.

2. they have at least one nitrogen-containing functional group which does not impart a basic reaction when the substance is dispersed or dissolved in aqueous solution. Illustrative of the nitrogen-containing groups of the type required are the following:

N-alkyl carbamates, such as N,N-carbamates, dithiocarbamates, N,N-dialkylthiocarbamates, dicarboximides, glutarimides carboxanilides, triazines, substituted ureas, etc.

Illustrative of the oil-insoluble substances which can be transformed to an oil-soluble form include among others:

1-naphthyl-N-methyl carbamate, 4-chloro-2-butynyl-m-chlorocarbanilate, 2-isopropoxyphenyl-N-methylcarbamate, N,N-di-n-propyl-thiolcarbamate, isopropyl N-phenyl carbamate, methyl N-(3,4-dichlorophenyl carbamate, n-propyl N-ethyl N-(n-butyl)thiocarbamate, 2-chloroallyl - N,N-diethyldithiocarbamate, s-2,3-dichloroallyl-N,N-diisopropylthiocarbamate, N-(1,1,2,2,-tetrachloroethylthio)-4- cyclohexene-1,2-dicarboximide, 3-[2-(3,5-dimethyl-2-oxocyclohexyl)-2-hydroxyethyl] glutarimide, N-trichloromethylmercapto-4-cyclohexene-1,2-dicarboximide, 4-(methylthio)-3,5-xylyl-methylcarbamate, o-isopropoxyphenyl N-methylcarbamate, 4-dimethylamino-3-tolyl-1-naphthyl-N-methyl-carbamate, 3,5-diisopropylphenyl-N-methylcarbamate, N-(2-ethylhexyl) bicyclo[2,2,1]-5-heptene-2,3-dicarboximide among others.

Triazines

2(ethylamino-4-(isopropylamino-6-(methylthio)-s-triazine, 2(ethylamino)-4-(isopropylamino)-6-methoxy-s-triazine, 2-chloro-4-(ethylamino)-6-isopropylamino-s-triazine, 2-chloro-4,6-bis(ethylamino)-s-triazine, 2,4-dichloro-6-(0-chloroaniline)-s-triazine,2-tert-butylamino-4-ethylamino-6 methylthio-s-triazine, 2,4-bis[(3-methoxypropyl)-amino]-6-methylthio-s-triazine.

Carbamates methyl 1-(butylcarbamoyl)-2-benzimidazole carbamate, s-ethyl diisobutylthiocarbamate, 2,3-dihydro-2,2-dimethyl-7-benzofuranyl methyl carbamate, S-ethyl dipropylthiocarbamate, 2,3,5-trimethylphenyl N-methylcarbamate, 4-(dimethylamino)-m-tolyl N-methylcarbamate, 4-benzothienyl N-methylcarbamate.

Others

3',4' dichlorocyclopropanecarboxanilide, 1,3-bis (1-hydroxy-2,2,2-trichlorethyl)urea.

C. Conditions Required for Oil-solubilization

1. Admixing Reactants

Generally speaking the admixture required for forming the reaction mixture can utilize any device capable of producing a homogenous mixture. These include stirring devices, blending devices, mills, etc. No. particular order of addition is required for operability. When the components are both liquids the usual procedure is to form a mixture of the normally oil-insoluble compound and a molar excess of alkylated-phenol type compound until the solution substantially clears, indicating that substantial solubilization has taken place.

2. Temperature and Pressure

Ordinarily ambient temperatures (i.e. between 20°–30 C.) are satisfactory for admixing the components of the mixture. In the case of recalcitrant oil-soluble compounds, solution can be effected by heating both materials together with or without agitation until they blend. Ordinarily no advantage accrues in using temperatures below about 20°–30° C. so that temperatures ranging from 20° C. and up are normally employed. The limiting factors in employing relatively high temperatures (i.e. above 100° C.) are the stability of the pesticidal component and/or the volatility of inert solvents that may be used. Volatility can be controlled by the use of a pressurized system but because of increased cost and operating hazards the usual practice is to use atmospheric pressures and temperatures not exceeding 100° C.

3. Relatively Low-Boiling Inert Solvent

As indicated earlier, the use of one or more inert solvents boiling under 100° C. is desirable where difficulty is encountered in obtaining dissolution of the pesticide in the alkylphenol. Generally speaking, most solvents or mixtures of solvents inert to reacting with one or both components, and sufficiently low-boiling to permit their ready removal by distillation at temperatures not exceeding 100° C. can be employed. When inert solvents are employed they can form up to about 70 percent of the final mixture weight. These solvents can be stripped of using conventional atmospheric or vacuum distillation, or the blends containing them can be kept in the unconcentrated form. Illustrative solvents include the lower alkanols such as methanol, ethanol and the propanols, dialkyl ethers, such as diethyl ether, methyl ethyl ether, ketones such as acetone, methyl ethyl ketone, aromatics such as benzene, toluene, xylene, etc., as well as tetrahydrofuran and the like.

4. Solubilization Times

The time required for preparation of the oil-insoluble form of the normally oil-insoluble compound cannot be stated with precision since it is dependent upon variables such as the nature of the oil-insoluble compound, the nature of the alkylated phenol-type compound, temperature employed and/or whether inert solvent is used. In some instances a clear, solvent-free concentrate can be attained in 10 minutes to one-half hour while other cases as much as 2–3 hours or more are required. Most solubilization takes place within 1 to 2 hours.

5. Types of Oil used for Dilution

Generally speaking any mineral oil of suitable viscosity for use as a conventional agricultural spray oil can be used. These include naphthenic, paraffinic and certain types of asphaltic oils having Saybolt viscosities at 100° F. from about 30–400 seconds. If the oil is intended for use with a herbicide, then naphthenic or asphaltic oils high in aromatics (e.g. 50 percent) may be used to advantage. Otherwise it is usually desirable to use a paraffinic oil, having an aromatic content less than 8 percent.

6. Ratio of Phenol-Type Compound to Normally Oil-Insoluble Compound

A molar excess of the phenol-type solubilizing agent is desirable. The exact excess required is a variable dependent upon the substance being solubilized and by the minimum amount of "phenol" required to achieve satisfactory solubilization. In most instances molar ratios of about 2:1 to 8:1 and higher of solubilizing agent to insoluble material will suffice with a narrower range of about 2:1 to 4:1 being preferred.

7. Preparation of Oil Solutions of Solubilized Compounds

After the complexes of alkylated phenol-type compounds and solubilized compounds are prepared they may be incorporated in oil by any of the conventional methods used in blending oil based compositions. For instance, the concentrate of solubilized compounds plus oil may be heated to 40° to 60° C. with mechanical agitation for 15 minutes or more until a clear blend is achieved.

8. Preferred Oil-Soluble Compositions

While a broad range of alkylated phenol-type solubilizing agents can be used, the favored group comprise the alkylated hydroxy mononuclear aromatics commonly referred to as "alkylphenols." Within this relatively narrow class, the preferred solubilizers are those mono-hydroxylated benzenes alkylated with alkyl groups containing from six to 12 carbon atoms, preferably branched. These compositions comprise from 25 to 95 parts by weight of these solubilizing agents and from five to 75 parts by weight of one or more pesticides selected from the group consisting of 1-naphthyl-N-methyl-carbamate (Sevin), 3-[2-(3-5-dimethyl-2-oxocyclohexyl)-2-hydroxyethyl]glutaramide (Actidione), N-trichloromethyl-4-cyclohexene-1,2-dicarboximide (Captan), 2-chloro-4-ethylamino-6-isopropylamino-s-triazine (Atrazine) and their mixtures. These are preferred compositions because they contain known potent pesticidal compounds.

9. Compounding Oil-Based Pesticidal Compositions

Since the solubilized pesticidal agents of this invention have solubility in petroleum-derived solvents they may be incorporated into a convenient petroleum-derived solvent in concentrations sufficient to achieve the desired pesticidal effect, that is, herbicidal, insecticidal, fungicidal, etc. Alternately, they may be used as is, without oil dilution. When the soluble pesticide is diluted with oil, the concentration of pesticide plus solubilizer employed depends upon the pesticidal agent or agents used, the effect desired and the pesticidal adjuvants accompanying the other ingredients. Ordinarily, amounts ranging from about 1 to 10 percent by weight of pesticide plus solubilizer are used, the remainder being oil. Higher concentrations up to 50 percent or more may be used if desired. The lower range referred to supra in most instances constitutes a pesticidal concentration. The above pesticidal agents are often accompanied by one or more pesticidal adjuvants which comprise from 0 to 10 percent by wt. of the total pesticidal composition. The optional agents used to condition, modify or enhance the desired pesticidal effect include such petroleum-soluble adjuvants as, for example, Malathion, DDT and numerous other products known in the technical* *(See for example "-Pesticidal Index", compiled and edited by E.H. Frear, 3rd edition, published by College Science Publisher, P.O. Box. 798, State College, Pa.) and patent literature. Also included as adjuvants are potentiators or synergists typified by piperonyl butoxide, Sesoxane [2-(3,4-methylenedioxyphenoxy)-3,6,9-trioxoundecane],sulfoxide (n-octyl sulfoxide of isosafrole), n-propyl isome, sesame oil extractives, octachlorodipropyl ether, etc. The formulation of the pesticidal compositions can be achieved by vigorously blending, mixing or stirring the solubilized pesticide plus solubilizer in a petroleum-based oil such as a highly refined paraffinic based solvent or an aromatic distillate having a viscosity SSU at 100° F. of about 35, at temperatures ranging from about 25° to 50° C. until a substantially homogeneous solution is achieved. These compositions can be sprayed or fogged using conventional equipment for applying liquids including hand and machine operated sprayers, from the air or from the ground.

In order to disclose the invention in the greatest possible detail, the following illustrative examples are submitted. Unless noted otherwise, parts and percentages are by weight.

Example 1

Solubilization of a Normally Oil-Insoluble Carbamate Compound

A 26 parts by weight portion of a phenol alkylated with propylene tetramer (having a mole weight of about 284) and 16 parts by weight of 1-naphthyl-N-methyl carbamate (Sevin) are stirred and heated to 50° to 60° C. with about 45 parts by weight of benzene to give a clear solution. The solution is stirred overnight on a steam plate, cooled, filtered and the residue washed once with about 10 parts by weight of pentane to remove occluded alkylphenol leaving 11.5 parts unsolubilized Sevin. The filtrate contains the complexed (or solubilized) carbamate. The benzene is evaporated off to give a clear liquid containing about 15 percent Sevin by weight. The latter when blended at 50° C. with a refined paraffinic oil (having an API gravity of 28.0–31.0 and an SUS viscosity at 100° F. of 325–335) gives a clear solution, which remained clear on cooling to room temperature.

In the absence of the alkylphenol solubilizer, the carbamate is soluble in the mineral oil to the extent of less than 0.1 percent at room temperature.

EXAMPLE 2

Solubilization of another Normally Oil-Insoluble Carbamate Compound

Using the same quantities of phenol-type compound, carbamate and benzene and the same process conditions and procedure disclosed in Example 1, the solubilizing process is repeated except that 26 parts by weight of 3,5-diisopropylphenyl N-methylcarbamate (whose preparation is described in U.S. Pat. No. 3,083,137) is substituted for the "naphthyl" type carbamate of Example 1. The same solubilizing effect is observed.

EXAMPLE 3

Solubilization of the Carbamate of Example 1, using another Phenol-Type Compound and another Paraffinic Oil A 44 parts by weight portion of a phenol alkylated with a propylene trimer (and having a molecular weight of about 220), is blended in a stirred beaker with 18 parts by weight of the carbamate of Example 1 and about 45 parts by weight of acetone to give a clear solution. The acetone is evaporated off at about 65° C. and the concentrate is cooled to 25° C. and filtered to remove solids. The weight of the solid residue after washing once with pentane and drying indicates that 10 parts carbamate were solubilized. The carbamate-nonylphenol solution containing about 18 percent Sevin by weight is soluble in a refined paraffinic oil having a API gravity of 31–35 and a viscosity SUS at 100° F. of 70.0–75.0.

Using the above procedure, 200 parts by weight of the above nonyl phenol, 50 parts by weight of the above-described carbamate and 270 parts by weight of acetone are blended to form a clear solution. A clear concentrate containing 20 percent carbamate is obtained after stripping off the acetone even after 5 days of standing at room temperature. A slightly less than 1 percent solution of the concentrate is stable in the paraffinic oil of Example 1.

EXAMPLE 4

Solubilization of the Carbamate of Examples 1 and 3 using another Phenol-Type Solubilizing Agent The procedure of Example 3 is followed in that 10 parts by weight of the carbamate of Examples 1 and 3 (Sevin) is blended with 45 parts by weight of acetone and 30 parts by weight of solubilizing agent. However, the phenol-type solubilizing agent employed is phenol alkylated with a tertiary butyl group, having a molecular weight of 149. A clear, hot solution is obtained when the acetone is stripped off, which, upon cooling, produces a solid. This concentrate is dissolved in the hot paraffinic oil used in Example 3. Upon cooling there was some separation of concentrate crystals.

EXAMPLE 5

Solubilization of the Carbamate of Example 5 using another Alkylated Phenol

A 30 parts by weight portion of 2,6-diisopropyl phenol (mole weight of about 182) and 10 parts by weight of the carbamate of Example 4 are blended with 45 parts by weight of acetone to give a clear solution. Upon stripping off the acetone no insoluble residue appeared but upon standing several days a total of about 3 parts by weight of crystals appeared. The clear filtrate is sufficiently soluble in the paraffinic oil of Example 1 to allow a 5 percent by weight solution to be prepared.

EXAMPLE 6

Solubilizing of the Carbamate of the Preceding example with another Alkylated Phenol-Type Solubilizing Agent A 60 parts by weight portion of dodecyl phenol (having a mole weight of about 242), 90 parts by weight of acetone and 20 parts by weight of the carbamate of the preceding example are blended to form a clear solution. The acetone is stripped off leaving no insoluble residue. The concentrate is soluble in the paraffinic oil of Example 3.

EXAMPLE 7

Solubilization of a Cyclic Imide using the Nonyl Phenol of Example 6

A 3 parts by weight portion of nonyl phenol (mol wt. 242) is stirred with 1 part by weight of a cycloheximide, 3-[2-(3,5-dimethyl-2-oxocyclohexyl)-2-hydroxyethyl]glutarimide, and 9 parts of acetone to give a clear solution. After stripping off the acetone a clear, yellow liquid is obtained which gives a clear solution in the paraffinic oil of Example 3 and a slightly hazy solution in the paraffinic oil of Example 1.

EXAMPLE 8

Solubilization of a dicarboximide 70 parts nonylphenol are added to 15 g. of N-(trichloromethylthio)-4-cyclohexene-1,2-dicarboximide along with 90 parts benzene and heated to 150° F. to give a clear solution. The benzene is allowed to evaporate and the resulting clear solution is cooled to 25° C. Filtered and recovered 7 parts unsolubilized dicarboximide. A 5 percent solution of the concentrate in the paraffinic oil of Example 3 is only slightly hazy.

EXAMPLE 9

Solubilization of a Triazine 20 parts 2-chloro-4-ethylamino-6-isopropylamino-s-triazine and 80 parts of the alkylphenol of Example 1 are heated and stirred with 40 parts acetone to give a clear solution. The acetone is evaporated to give a clear dark green concentrate which is soluble at 5% by weight in the paraffinic oil of Example 1. It is also readily soluble in a herbicidal oil containing 53 percent aromatics and having a Saybolt viscosity at 100° F. of 37 seconds.

EXAMPLE 10

The composition of Example 3, when tested according to accepted procedures for determining insecticidal activity against the Mexican bean beetle at a dosage of 50 ppm (equivalent to 10 ppm Sevin), gave 100 percent control of the insect and inhibited feeding to the extent of 90 percent. By the same test procedure 12.5 ppm uncomplexed Sevin gave 100 percent control of the insect and inhibited feeding to the extent of 10 percent. When the composition of Example 3 was applied at the rate of 10 lbs. per acre, no phytotoxicity was observed towards corn, soybean, cotton, rice, alfalfa or oats.

As the numerous examples and the specification indicate, the novel invention offers several advantages both in the process and compositional aspects concerned.

Insofar as the process is concerned, the process offers the first practical means of transforming normally oil-insoluble compounds possessing at least one of the aforementioned nitrogen-containing functional groups to an oil-soluble form. The process is simple and utilizes commercially available, or easily produced phenol-type compounds as the solubilizing agents. In addition, reaction conditions are mild, usually requiring ambient temperatures and atmospheric pressures. Finally the solubilized product can be obtained in the form of diluted solutions or relatively stable concentrates.

In its compositional aspects, the invention provides the first oil-soluble forms of organic compounds, particularly pesticides, which contain at least one imido and carbamate group. The solubilization appears to have left the pesticidal activity unchanged. In addition, as described earlier, the novel compositions have better adherence to plant substrates, obviating frequent applications of pesticides in areas of high humidity and rainfall. Further, toxic buildup of pesticides into adjacent land and water supplies are minimized. Finally the use of oil-soluble forms of specific pesticides such as Captan, Sevin, Actidione and Atrazine permit their effective application from aircraft.

Finally, the subject invention lends itself to numerous changes, substitutions and modifications without departing from the inventive concept. For example, temperatures and pressures are mild, reactants are varied and results are consistent. The metes and bounds are best determined by a reading of the claims taken in conjunction with the specification.

What is claimed is:

1. A process for converting normally paraffinic oil-insoluble pesticidal compounds possessing nitrogen-containing functional groups which when dispersed or dissolved in water do not give a basic reaction, said pesticidal compounds being selected from the compounds consisting of 1-naphthyl-N-methylcarbamate, 4-chloro-2-butynyl-m-chlorocarbanilate, 2-isopropoxyphenyl-N-methylcarbamate, N,N-di-n-propyl-thiolcarbamate, methyl-N-(3,4-dichlorophenyl) carbamate, n-propyl-N-ethyl-N-(n-butyl) dithiocarbamate, 2-chloroallyl-N,N-diethyldithiocarbamate, s-2,3-dichloroallyl-N,N-diisopropylthiocarbamate, N-(1,1,2,2,-tetrachloroethylthio)-4-cyclohexene-1,2-dicarboximide,3-[2-(3,5-dimethyl-2-oxycyclohexyl)-2-hydroxyethyl]glutarimide, N-trichloromethylmercapto-4-cyclohexene-1,2-dicarboximide, 4-(methylthio)-3,5-xylyl-N-methylcarbamate, o-isopropoxyphenyl-N-methylcarbamate, 4-dimethylamino-3-tolyl-1-naphthyl-N-methylcarbamate, 3,5-diisopropylphenyl-N-methylcarbamate, N-(2-ethylhexyl) bicyclo[2,2,1]-5-heptene-2,3-dicarboximide, 2(ethylamino-4-(isopropylamino-6-(methylthio)-s-triazine, 2(ethylamino)-4-(isopropylamino)-6-methoxy-s-triazine, 2-chloro-4-(ethylamino)-4-(isopropylamino)-6-methoxy-s-triazine, 2-chloro-4-(ethylamino)-6-isopropylamino-2-triazine, 2-chloro-4,6-bis(ethylamino)-s-triazine, 2,4-dichloro-6-(o-chloroaniline)-s-triazine, 2-tertbutylamino-4-ethylamino-6-methylthio-s-triazine, 2,4-bis[(3-methoxypropyl)-amino]-6-methylthio-s-triazine, 1-(butylcarbamoyl)-2-benzimidazole-N-methylcarbamate, s-ethyl-N-diisobutylthiocarbamate, 2,3-dihydro-2,2-dimethyl-7-benzofuranyl-N-methylcarbamate, s-ethyl-N-dipropylthiocarbamate, 2,3,5-trimethylphenyl-N-methylcarbamate, 4-(dimethylamino)-m-tolyl-N-methylcarbamate, 4-benzothienyl-N-methylcarbamate, 3',4' dichlorocyclopropanecarboxanilide, and 1,3-bis(1-hydroxy-2,2,2-trichloroethyl)urea, to an oil-soluble form, comprising the steps of:

a. admixing from about 2 to 8 moles of at least one hydroxylated benzene nucleus alkylated with alkyl groups containing three to 100 atoms, with each mole of said normally oil-soluble compound in the presence of relatively low-boiling, inert solvent, to form an admixture, and b. heating said admixture containing said normally oil-insoluble pesticide, at a temperature ranging between 20° to 100° C., until a clear solution of the admixture containing said pesticidal compound is obtained.

2. The process of claim 1 wherein the hydroxylated benzene nucleus is phenol alkylated with alkyl groups containing six to 12 carbon atoms.

3. The process of claim 2 wherein the alkylated phenol is a mixture of alkylated phenols where the alkyl groups contain from six to 12 carbon atoms.

4. The process of preparing oil-soluble concentrates of normally oil-insoluble pesticidal organic compounds possessing nitrogen-containing functional group selected from the compounds consisting of 3,5-diisopropyl-N-methylcarbamate, 1-naphthyl-N-methylcarbamate, 3-[2-(3,5-dimethyl-s-oxo-cyclohexyl)-2-hydroxyethyl] glutarimide, N-trichloromethyl-4-cyclohexene-1,2-dicarboximide, 2-chloro-4-ethylamino-6-isopropylamine-s-triazine, and mixtures of these compounds comprising the steps of:

a. admixing from about 2 to about 4 moles of at least one mono-hydroxylated benzene nucleus alkylated with alkyl groups containing from about six to 12 carbon atoms with each mole of said normally oil-insoluble pesticidal organic compounds, in the presence of from about 0.5 to 2 times their weight of inert solvent boiling between about 30° to 120° C. to form a fluid admixture, and b. heating said fluid admixture containing said normally oil-insoluble pesticide, at temperatures between about 20° to about 30° C., until a substantially clear solution containing said pesticidal compound is obtained, and c. stripping off said inert solvent to produce a substantially clear concentrate of the formerly oil-insoluble organic pesticidal compounds.

5. The process of claim 4 wherein the substantially clear solution obtained in step (b) is clarified prior to stripping.

6. The process of claim 4 wherein the pesticide is 1-naphthyl-N-methyl carbamate.

7. The process of claim 1 wherein said normally oil-insoluble pesticidal compound is 3,5-diisopropyl-phenyl Nimethylcarbamate.

8. The process of claim 1 wherein the pesticidal compound is N-trichloromethylmercapto-4-cyclohexene-1,2-dicarboximide.

9. The process of claim 4 wherein the pesticidal compound is 3-[2-(3,5-dimethyl-2-oxocyclohexyl) -2-hydroxyethyl] glutarimide.

10. The process of claim 4 where the pesticidal compound is 2-chloro-4-ethylamino-6-isopropylamino-s-triazine.

11. The oil-solubilized concentrates prepared by the process of claim 1.

12. The oil soluble pesticidal compounds produced by the process of claim 4.

13. An oil-soluble concentrate of normally oil-insoluble, pesticidal compounds possessing at least one nitrogen-containing functional group selected from the compounds consisting of 1-naphthyl-N-methyl-carbamate, 3-[2-(3,5-dimethyl-2-oxocyclohexyl)-2hydroxyethyl] glutarimide, N-trichloromethylmercapto-4-cyclohexene-1,2-dicarboximide, 2-chloro-4-ethylamino-6-isopropylamino-s-triazine, 3,5-diisopropylphenyl-N-methylcarbamate and mixtures of these compounds said concentrate comprising:

a. from about 25 to 95 parts by weight of at least one mono-hydroxylated benzene nucleus alkylated with branched chain alkyl groups containing from about six to 12 carbon atoms, b. from about 5 to 75 parts by weight of said pesticidal compounds.

14. The mineral oil composition of claim 13 comprising at least 1 percent by weight of the oil-soluble pesticidal concentrate and from 10 to 99 percent by weight of mineral oil.

* * * * *

PO-1050
(5/69)

UNITED STATES PATENT OFFICE
CERTIFICATE OF CORRECTION

Patent No. 3681348          Dated August 1, 1972

Inventor(s) Frederic C. McCoy; Carl Loyal W. Swanson

It is certified that error appears in the above-identified patent and that said Letters Patent are hereby corrected as shown below:

Col. 1, line 47:     "concentrations" should read --concentrates--

Col. 2, line 28:     "three" should read --3--

Col. 4, line 21:     Delete the "." after "No"

Col. 11, line 3:     "Nimethylcarbamate" should read --N-methylcarbamate--

Signed and sealed this 14th day of May 1974.

(SEAL)
Attest:

EDWARD M. FLETCHER, JR.          C. MARSHALL DANN
Attesting Officer                Commissioner of Patents